United States Patent [19]

Balius

[11] 3,889,624
[45] June 17, 1975

[54] RETRACTABLE PROPELLER GUARD FOR OUTBOARD MOTOR OR STERN DRIVE UNIT

[76] Inventor: Donald G. Balius, 1003 Caillavet St., Biloxi, Miss. 39530

[22] Filed: June 13, 1974

[21] Appl. No.: 479,257

[52] U.S. Cl. .............................................. 115/42
[51] Int. Cl. ............................................. B63h 5/16
[58] Field of Search ............... 115/34 R, 42, 17, 6.1, 115/70

[56] References Cited
UNITED STATES PATENTS

| 2,244,217 | 6/1941 | Pries | 115/42 |
|---|---|---|---|
| 2,355,842 | 8/1944 | Arado | 115/42 |
| 2,470,874 | 5/1949 | Sidney | 115/42 |
| 2,983,246 | 5/1961 | Manley | 115/42 |
| 3,035,538 | 9/1962 | Willard | 115/42 |
| 3,802,377 | 4/1974 | Porter et al. | 115/42 |

FOREIGN PATENTS OR APPLICATIONS

| 564,057 | 9/1958 | Canada | 115/42 |
|---|---|---|---|
| 90,330 | 6/1896 | Germany | 115/42 |
| 17,854 | 3/1907 | Norway | 115/42 |
| 1,289,967 | 2/1962 | France | 115/42 |

*Primary Examiner*—Trygve M. Blix
*Assistant Examiner*—Edward R. Kazenske
*Attorney, Agent, or Firm*—Clarence A. O'Brien; Harvey B. Jacobson

[57] ABSTRACT

A clamp-type mounting bracket including front and rear ends is provided for clamping engagement about the lower portion of the upstanding power leg of an outdrive marine propulsion unit of the type including a horizontal cavitation plate spaced above a marine propeller journaled from the power leg lower portion and with the clamp type mounting bracket positioned immediately above the cavitation plate. A rod cage constructed of contoured, crossed and interconnected rod members is further provided and includes opposite upstanding side portions and a rear portion extending between and interconnecting the rear ends of the side portions. Upper forward end portions of the side portions of the cage are pivotally supported from the front portion of the clamp-type bracket for oscillation of the cage about a horizontal transverse axis. The cage opens forwardly between the forward ends of the side portions as well as upwardly and downwardly between the upper and lower marginal portions, respectively, of the side portions of the cage. Further, the cage is swingable between an operative generally horizontally disposed position opening forwardly in a horizontal direction and an inoperative rearwardly and upwardly tilted position with the cage opening forwardly in a forwardly and downwardly inclined position. The upper marginal portions of the side portions of the cage include inwardly directed portions for abuttingly engaging corresponding opposite side upper surface portions of the cavitation plate establishing the lower limit of swinging movement of the rear end of the cage to a position with the cage in its operative position.

9 Claims, 7 Drawing Figures

PATENTED JUN 17 1975 3,889,624

SHEET 1

RETRACTABLE PROPELLER GUARD FOR OUTBOARD MOTOR OR STERN DRIVE UNIT

BACKGROUND OF THE INVENTION

Various types of outboard motor and outdrive propeller guard assemblies have been heretofore designed, but most of these previous propeller guards have been of the type whereby when their use is desired they must be mounted on an associated outboard motor or outdrive and when their use is not desired they must be removed from the associated outboard motor or outdrive assembly. Examples of previously patented propeller guards of this type are disclosed in U.S. Pat. Nos. 1,620,129, 2,983,246, 3,035,538 and 3,314,392.

BRIEF DESCRIPTION OF THE INVENTION

The propeller guard of the instant invention includes a forwardly upwardly and downwardly opening rod cage constructed of contoured, crossed and interconnected rod members with the cage closed at its rear end by transverse rod members. A mounting bracket is provided for attachment to the associated outboard motor or outdrive power leg and the cage is oscillatably supported from the mounting bracket for swinging movement between a lowered generally horizontal operative position and a raised forwardly and downwardly inclined inoperative position. The pivotal mounting of the cage from the support bracket is such that the cage is biased by gravity toward the operative position thereof and the mounting bracket includes latching structure for releasably securing the cage in the lowered operative position against upward swinging toward the inoperative position due to rapid forward movement of the cage through the water. The forward lower marginal portions of the opposite sides of the cage curve forwardly and upwardly and are provided with transversely enlarged flanges which, when the latch securing the cage in the lowered operative position is released, automatically function to swing the cage toward its inoperative position in response to forward movement of the associated outboard motor or outdrive assembly through the water.

The main object of this invention is to provide a retractable propeller guard for an outboard motor or stern drive unit and constructed in a manner whereby the guard will substantially fully enclose the propeller of the associated drive unit and thus render it nearly impossible for swimmers to come in contact with the propeller or the propeller to come in contact with the bottom when running in shoal waters.

Another object of this invention is to provide a retractable outboard motor and stern drive propeller guard assembly constructed in a manner such that it may be readily attached to substantially all popular makes of outboard motors and stern drive units.

Still another object of this invention is to provide a propeller guard of the retractable type and yet which may be locked in the operative position.

A final object of this invention to be specifically enumerated herein is to provide a propeller guard in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
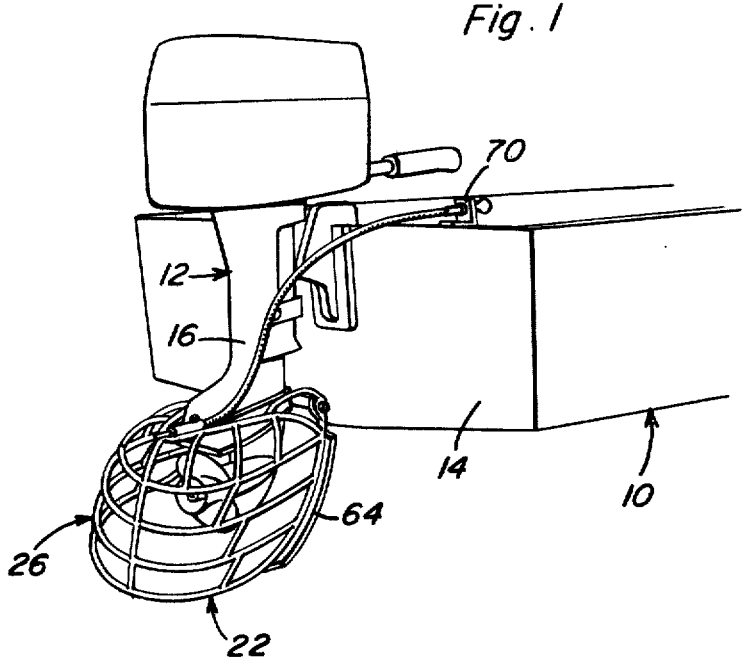
FIG. 1 is a fragmentary perspective view of the rear portion of an outboard motorboat with a propeller guard constructed in accordance with the present invention operatively associated with the lower end of the power leg of the outboard motor mounted on the transom of the boat.
Figure 6:
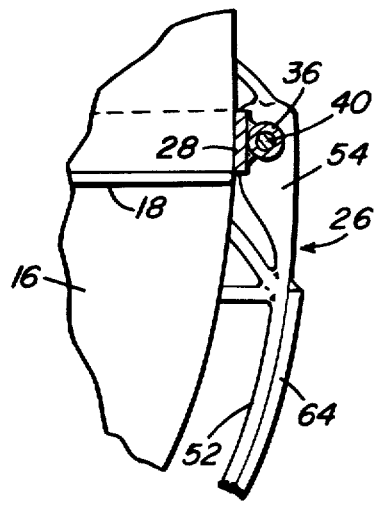
FIG. 6 is a fragmentary vertical sectional view taken substantially upon a plane indicated by the section line 6—6 of FIG. 4.

Referring now more specifically to the drawings, the numeral 10 generally designates a conventional form of small outboard runabout-type boat having a conventional form of outboard motor referred to in general by the reference numeral 12 mounted on its transom 14. The outboard motor 12 includes a power leg 16 and the lower end of the power leg includes a horizontal cavitation plate 18 beneath which a marine propeller 20 is journaled.

The propeller guard of the instant invention is referred to in general by the reference numeral 22 and includes an adjustable clamp-type mounting bracket referred to in general by the reference numeral 24 and a rod cage referred to in general by the reference numeral 26.

The mounting bracket 24 comprises a strip 28 of strap metal transversely bent along its length to define a generally teardrop-shaped frame with spaced apart ends 30 and 32 at its tapering end. The ends 30 and 32 are provided with aligned apertures through which a clamping bolt 34 is secured. In this manner, the mounting bracket 24 may be tightly clamped about that portion of the power leg 16 disposed immediately above the cavitation plate 18.

The forward end of the mounting bracket 24 has the mid-portion of a horizontal transverse support sleeve 36 secured thereto as by welding 38 and a pivot shaft 40 is passed through and journaled in the sleeve 36.

The cage 26 includes upstanding opposite side portions 42 and 44 and an integral curved and forwardly opening rear portion 46 extending between the rear ends of the side portions 42 and 44. The rear portion 46 forms an integral continuation of and interconnects the rear ends of the side portions 42 and 44 and each of the side portions 42 and 44 includes an inwardly displaced upper marginal member 48 and the rear ends of the upper marginal members 48 are interconnected by means of an integral curved bight portion 50 extending therebetween.

The forward marginal edges of the side portions 42 and 44 are defined by forwardly and upwardly curving members 52 and the upper ends of the members 52 are flattened as at 54 and have apertures formed therethrough in which the opposite ends of the pivot shaft 40 are rotatably received. The opposite ends of the pivot shafts 40 are secured through the flattened portions 54 by means of threaded fasteners 56.

Figure 2:
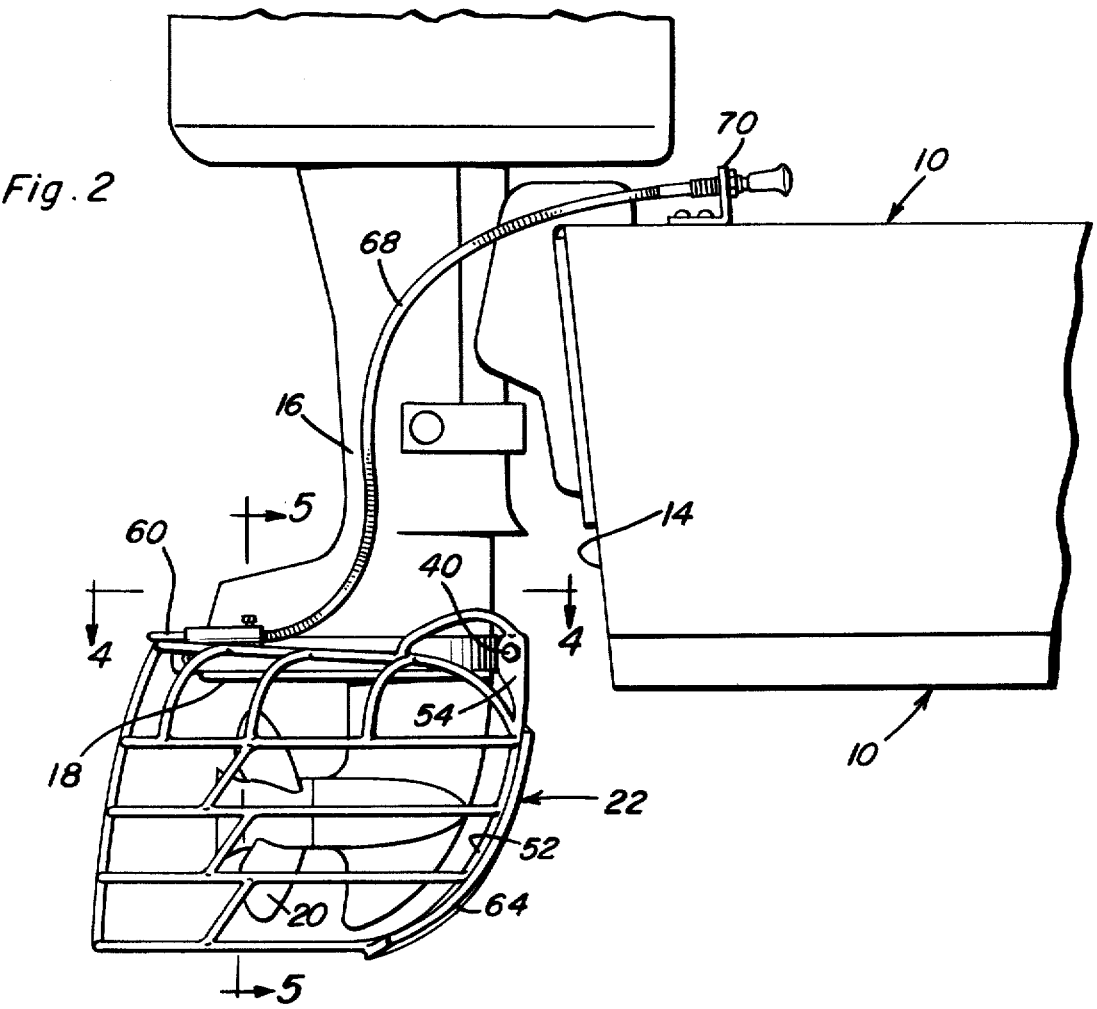
FIG. 2 is an enlarged side elevational view of the assemblage illustrated in FIG. 1.
Figure 3:
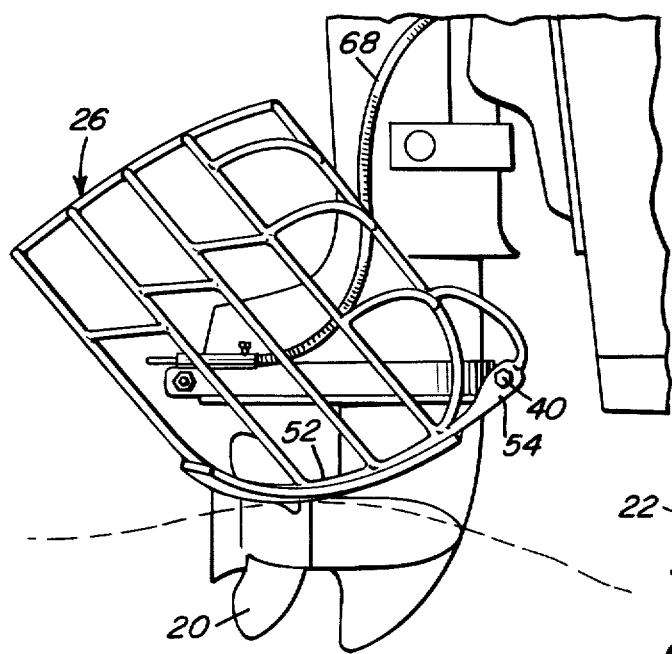
FIG. 3 is a fragmentary side elevational view similar to FIG. 3 but with the propeller guard in the retracted position.
Figure 7:
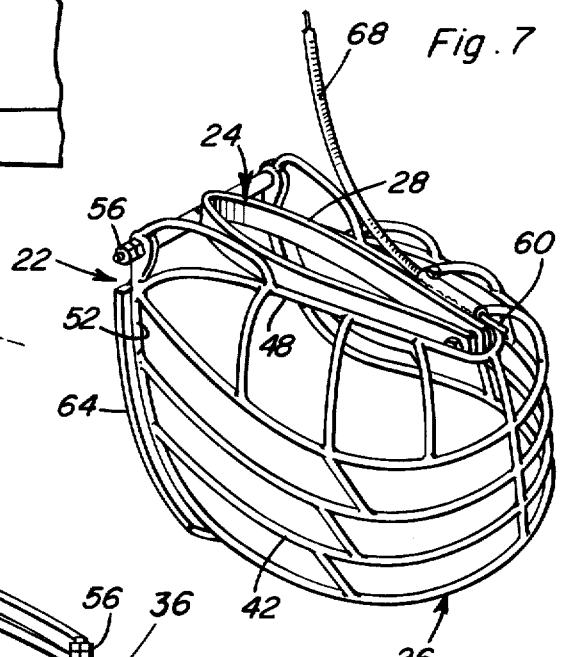
FIG. 7 is a perspective view of the propeller guard
Figure 4:
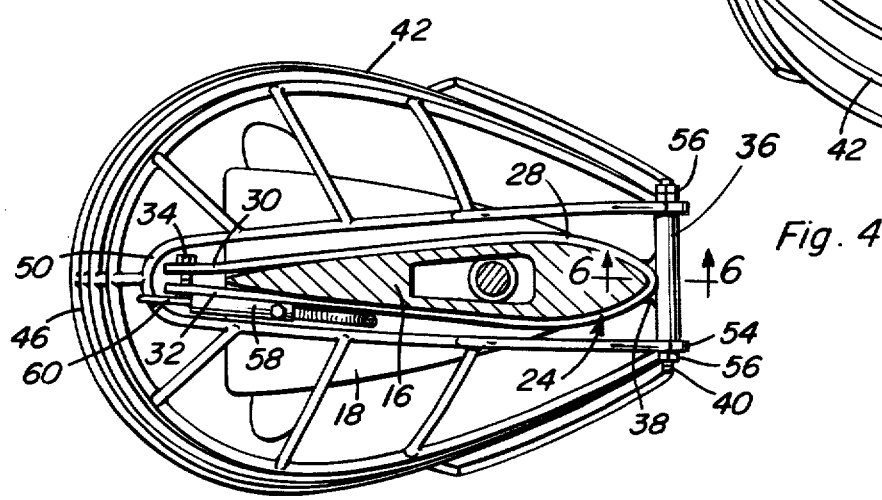
FIG. 4 is an enlarged horizontal sectional view taken substantially upon a plane indicated by the section line 4—4 of FIG. 2.
Figure 5:
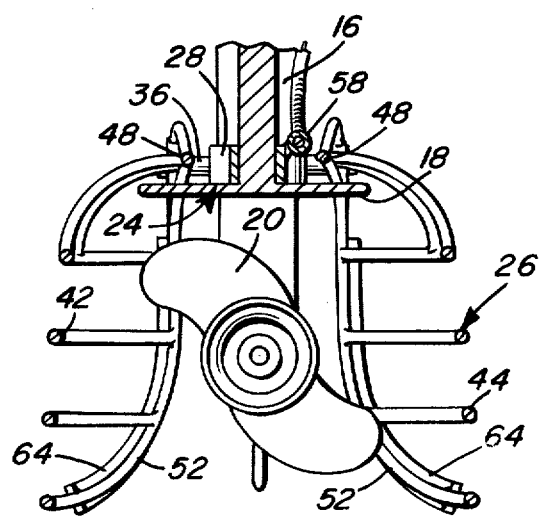
FIG. 5 is a fragmentary vertical sectional view taken substantially upon a plane indicated by the section line 5—5 of FIG. 2.

The cage 26 is thus pivotally supported from the forward end of the mounting bracket 24 for swinging movement between the lowered horizontal operative position illustrated in FIG. 2 of the drawings and the raised inoperative position illustrated in FIG. 3 of the drawings. When in the lowered position the upper marginal members 48 may be disposed for contact with the upper surfaces of the opposite side portions of the cavitation plate 18 in order to establish a lower limit of downward swinging movement of the cage 26. Further, a latch sleeve 58 is secured to the outer side of the end portion 32 of the strip 28 and slidably supports a latching pin 60 therefrom. The pin 60 is extendable and retractable relative to the sleeve 58 and may be extended to the positions thereof illustrated in FIGS. 2, 4 and 7 of the drawings overlying the bight portion 50 and thus preventing upward swinging movement of the rear end of the cage 26 from the operative position thereof toward the inoperative position illustrated in FIG. 3.

The members 52 have flange members 64 secured to their forward surfaces and the flange members 64 offer considerable cross-sectional area upon which water may impinge when the outboard motor 12 is moving forwardly through the water. When the latch pin 60 is retracted from a position overlying the bight portion 50, forward movement of the outboard motor 12 above trolling speed is sufficient to enable water impinging upon the flange member 64 to exert sufficient force on the cage 26 in order to pivot the latter from the lowered operative position thereof illustrated in FIG. 2 to the raised operative position thereof illustrated in FIG. 3. A flexible bowden cable 68 has one end thereof operatively connected with the sleeve 58 and the pin 62 and the other end of the bowden cable 68 may be suitably mounted, as by clamp 70, on the transom 14 of the boat 10 for ease in actuation of the latch pin 60 whenever desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A mounting bracket including means for support from the lower portion of the upstanding power leg of an outdrive marine propulsion unit of the type including a horizontal cavitation plate spaced above a marine propeller journaled from the power leg lower portion, said bracket including front and rear portions, a rod cage constructed of contoured, crossed and interconnected rod members, said cage including opposite upstanding side portions and a rear portion extending between and interconnecting the rear ends of said side portions, means pivotally supporting upper forward end portions of said side portions from the front portion of said bracket for oscillation of said cage about a horizontal transverse axis, said cage opening forwardly between the forward ends of said side portions as well as upwardly and downwardly and being swingable relative to said bracket between an operative generally horizontally disposed position opening forwardly in a horizontal direction and an inoperative rearwardly and upwardly tilted position with said cage opening forwardly in a forwardly and downwardly inclined direction.

2. The combination of claim 1 wherein the upper portions of said side portions include inwardly directed portions adapted to abuttingly engage the corresponding opposite side upper surface portions of said cavitation plate.

3. The combination of claim 1 wherein the lower marginal portions of said side portions curve upwardly at their forward ends and include wide forwardly and downwardly facing surfaces defining reaction surfaces for generating a rearward and upward thrust on the forward lower portions of said cage in response to high speed forward movement through water, whereby said thrust will swing said cage toward the inoperative position thereof.

4. The combination of claim 1 wherein said mounting bracket includes a band-type clamp constructed of heavy gauge strap metal for clamping about said power leg lower portion.

5. The combination of claim 1 including releasable latch means operatively associated with said mounting bracket and a rear portion of said cage for locking said cage in said operative position against angular displacement toward said inoperative position.

6. The combination of claim 5 wherein said releasable latch means includes an actuator therefore and operatively associated therewith selectively mountable in a location remote from said cage.

7. The combination of claim 6 wherein the upper portions of said said portions include inwardly directed portions adapted to abuttingly engage the corresponding opposite side upper surface portions of said cavitation plate.

8. The combination of claim 7 wherein the lower marginal portions of said side portions curve upwardly at their forward ends and include wide forwardly and downwardly facing surfaces defining reaction surfaces for generating a rearward and upward thrust on the forward lower portions of said cage in response to high speed forward movement through water, whereby said thrust will swing said cage toward the inoperative position thereof.

9. The combination of claim 8 wherein said mounting bracket includes a band-type clamp constructed of heavy gauge strap metal for clamping about said power leg lower portion.

* * * * *